United States Patent
Ben-Michael et al.

(10) Patent No.: US 6,404,822 B1
(45) Date of Patent: Jun. 11, 2002

(54) CONTROL OF BROADBAND VOICE AND DATA COMMUNICATION OVER A LOW QUALITY NOISY TRANSMISSION MEDIA

(75) Inventors: Rafael Ben-Michael, Scotch Plains; Robert Bennett, Brick; Robert Raymond Miller, II, Morris Township, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/312,281

(22) Filed: May 14, 1999

(51) Int. Cl.[7] ............ H04K 1/02; H04L 25/03; H04L 25/49
(52) U.S. Cl. ............ 375/296; 375/285; 375/224; 370/252
(58) Field of Search ............ 375/224, 227, 375/228, 254, 259, 260, 285, 296, 295; 370/241, 248, 249, 252; 455/501, 63, 67.1, 67.3, 115

(56) References Cited

U.S. PATENT DOCUMENTS 4,417,337 A * 11/1983 Favin et al.
5,933,021 A * 8/1999 Mohd .................. 326/30

* cited by examiner

Primary Examiner—Jean Corrielus

(57) ABSTRACT

A method and apparatus improves transmission quality of transmission media in a punctuated noise environment by terminating transmission during duration of punctuated large noise changes and alters network parameters, of the transmission media, to accommodate changes in level of stable noise conditions between punctuated large noise changes. Each stable noise level encountered is measured and its characteristics (i.e., level) is stored in a data base and associated network parameters (i.e., bit rates, bandwidth etc.) are changed accordingly and used to control or maintain quality of the transmission media.

14 Claims, 3 Drawing Sheets

CONTROL OF BROADBAND VOICE AND DATA COMMUNICATION OVER A LOW QUALITY NOISY TRANSMISSION MEDIA

FIELD OF THE INVENTION

This invention relates to digital and analog transmission of signals using noisy communication distribution facilities having severe punctuated noise occurring followed by changes in steady state noise level. It is particularly concerned with an algorithm and a process that will allow for optimization and increase of throughput of voice and data transmission over noisy link or wire networks. In one aspect it concerns access to premises through power line distribution facilities network, in-premises broadband services distribution and in-premises voice or data networks

BACKGROUND OF THE INVENTION

In a noisy communication link environment where the transmission medium may change its noise level in a punctuated fashion (i.e., dramatically), there are intermediate steps in time in which the noise level of the transmission medium is relatively stable although not necessarily at a constant level of past stable noise levels. These stable noise levels occur in between the abrupt punctuated changes of noise level in the transmission environment.

Such noise level conditions of punctuated noise and in between stable noise levels may occur in many transmission environments. One environment which may be used for telephone communication within a local area and within a residence is the power wiring or power line environment. Examples of such impedance changes in the power line network may be due to operation or termination of operation of major appliances and other power usage equipment in the premises and are not predictable. When they occur as the equipment starts to operate, it operates for a given amount of time and then ceases to operate. The beginning and cessation of operation each causes a punctuated noise occurrence or a noise spike. In between the noise is stable but not necessarily at a consistent level compared with previous stable noise levels. Typically the time duration in which the change (i.e., turn on, turn off) was made is very short in duration ($t_0$) and to the time duration of the stable noise level in which there are no significant changes is relatively long in duration as ($t_1$). These changes occur in a short time to and that the duration of the time in which the changes are not strong is $t_1$. In algebraic terms:

$$t_1 >> t_0$$

In a power line network, for example, each of these punctuated noise occurrences introduces different subsequent semi-stable noise levels into the power wire network, and creates a different impedance load over the power line wire network. The punctuated noise depicts itself in many ways (i.e. reflections from the power line network), that have to be dealt with. Moreover, any combination between both noise sources created causes different levels of semi-stable noise, and different levels of attenuation of the power wires network in the premises.

SUMMARY OF THE INVENTION

A method and apparatus, according to principles of the invention, improves transmission quality of transmission media in a punctuated noise environment by terminating transmission during duration of punctuated large noise changes and alters network parameters, of the transmission media, to accommodate changes in level of stable noise conditions between punctuated large noise changes. Each stable noise level encountered is measured and its characteristics (i.e., level) is stored in a data base and associated network parameters (i.e., bit rates, bandwidth etc.) are changed accordingly and used to control or maintain quality of the transmission media.

An algorithm to allow for better utilization of the potential throughput of the transmission system under this environment detects a punctuated noise occurrence and halts transmission on the transmission media during that occurrence and then determines the appropriate parameters for optimal transmission during the next period of stable state noise. It is based on adaptation to the noise and to the transmission environment changes after detecting changes and on continuous operation when the changes are nominally low (i.e., a stable state of noise).

Another aspect of the invention is to record typical steady state noise characteristics and to use a transmission parameter set that is right for the appropriate steady state noise environment. This allows for minimal transmission of management information over the network, and reduces the time needed for the network modems to adapt to the new noise changes in the environment. When a system is simultaneously supporting voice and data, it is crucial to support the quality of service expected for voice conversation, and yet maintain ample bandwidth to support the ever-increasing data transmission demand. In accordance with the invention the usage of power line wire network (for example) is optimized for transmission of simultaneous voice and data on the same system.

DETAILED DESCRIPTION

Figure 1:
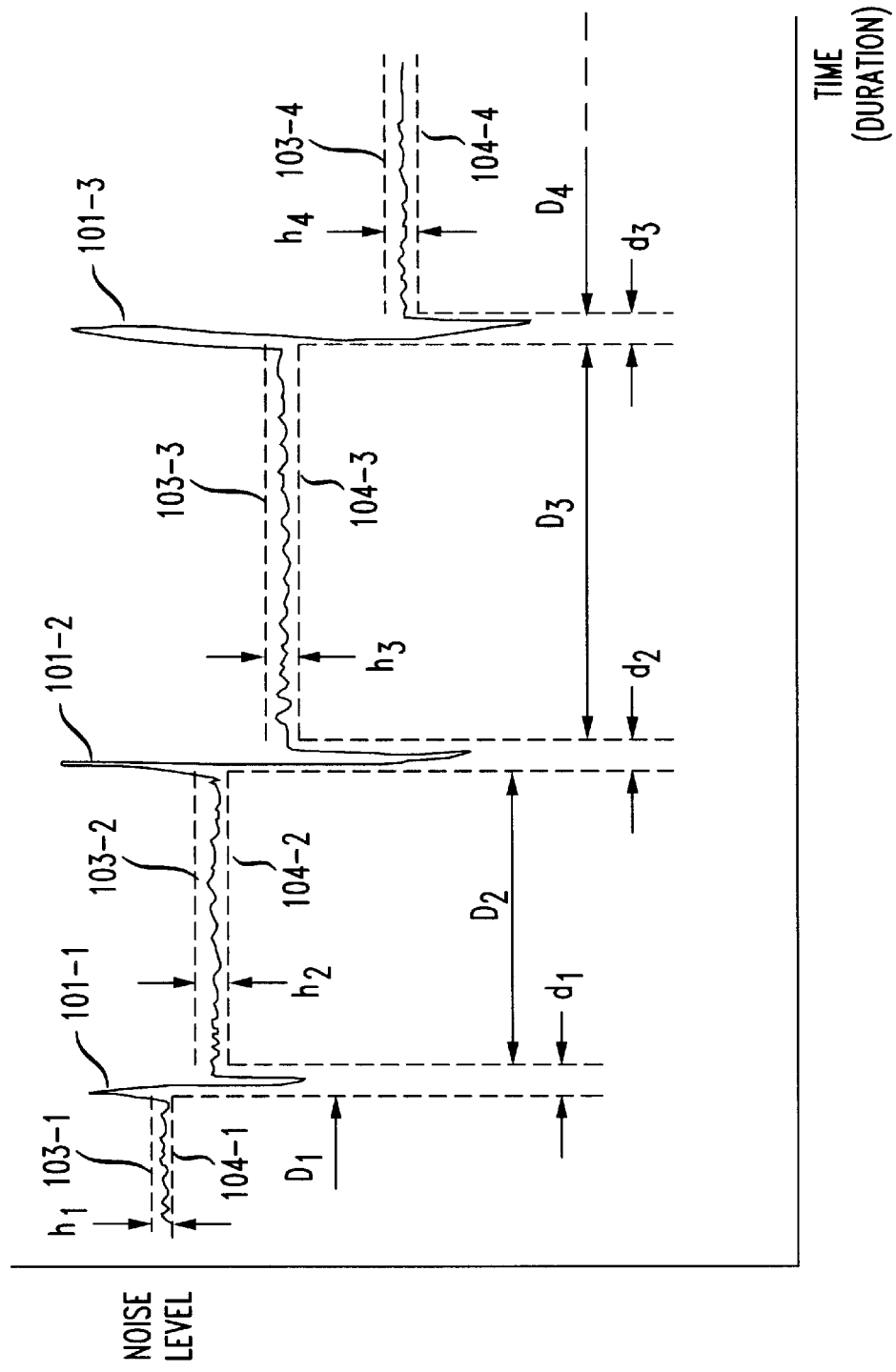
FIG. 1 is a graph of typical noise patterns realized on transmission media subject to large punctuated noise intrusions.

Typical noise patterns of transmission media subject to large punctuated noise and changing levels of stable noise levels subsequent to many large punctuated noise intrusions may exhibit a noise behavior such as graphed in FIG. 1. Power line channel characterization measurements, for example, show that punctuated changes in the transmission medium are short in nature (in time duration of tens microseconds). These abrupt punctuated changes in the transmission environment impose significant difficulties in creating a stable communication and network sessions between modems on a power line based network. The subsequent stable levels are longer in duration (seconds, minutes etc.).

Punctuated noise 101-N as shown is spiked and short in duration "$d_n$". In contrast the semi-stable noise 102-N is substantially longer n duration "$D_N$" and constant in a range band "$h_n$" and is substantially retained between the range band upper and lower amplitude limits 103-N and 104-N. The punctuated spiked noise is identified by network parameters such as bit-error-rates or by exceeding the amplitude boundary limits 103-N and 104-N while the steady state noise is identified by its extended duration "$D_N$". Each range of steady state noise defines certain operating parameters applied to the network to permit its proper and quality operation.

Figure 2:
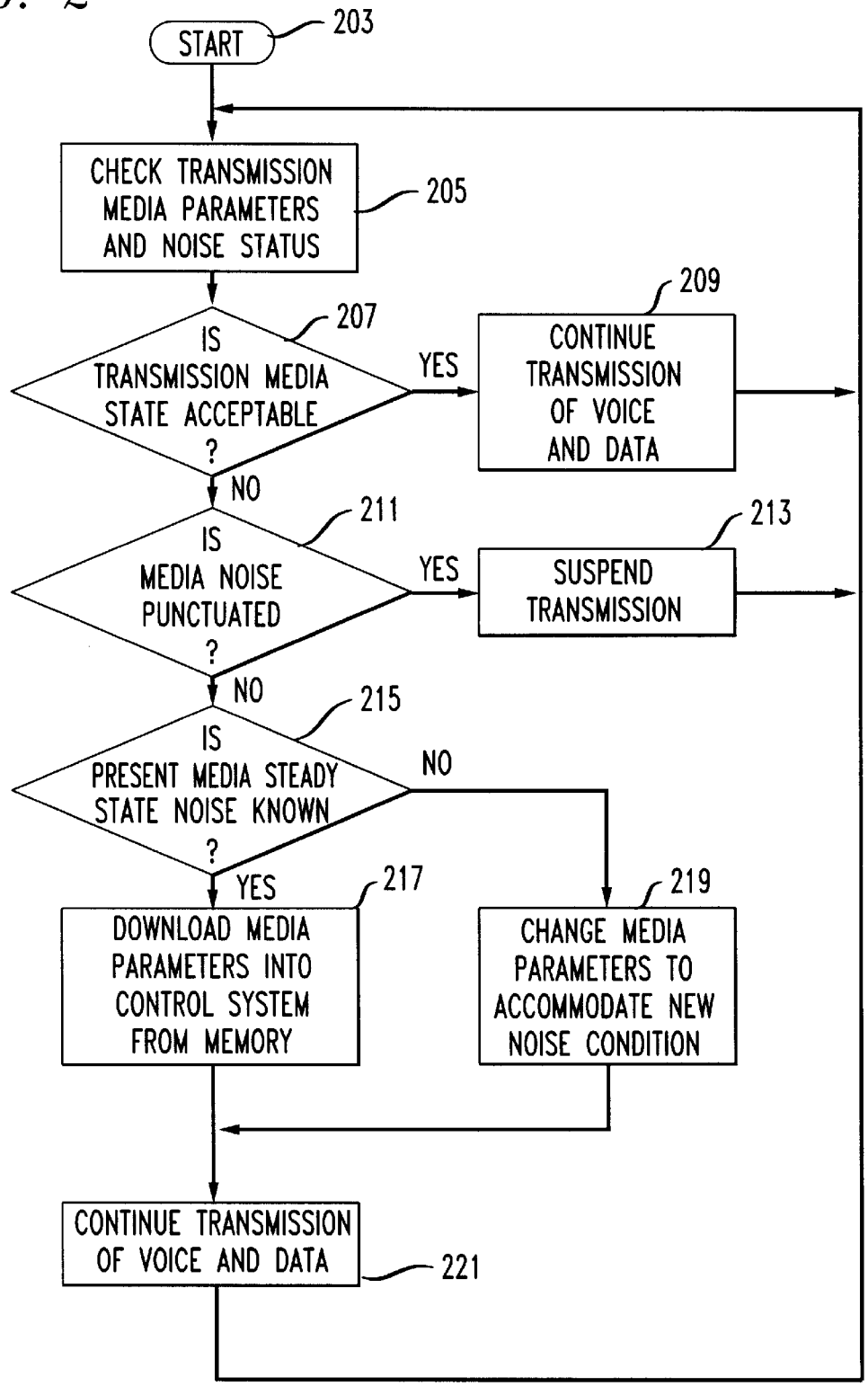
FIG. 2 is a flow chart of a procedure to respond to the noise patterns of FIG. 1 to optimize optimized for transmission of simultaneous voice and data on the same system.

Given the transmission and noise environment described above, an algorithm is implemented in one embodiment of the invention to make a better utilization of the transmission medium, for optimized transmission speed with a given error rate. This algorithm, shown in the flow chart of FIG. 2 can be applied to many modulation and multiplexing schemes of a transmission media. The control objective is to adapt to the changes in the transmission medium in a timely manner, and frequently enough to assure a quality transmission media.

The objectives of timely and frequent response must be balanced against each other. These two requirements are contradicting—adaptation of the transmission too frequently results in high transmission media overhead On the other hand if the adaptation is not done frequently enough changes in environment and the transmission media will cause the transmission system to operate not in it's optimal state, in respect to the transmission medium.

The adaptation is designed around the noise and impedance changes, and on the attenuation changes. The algorithm operates to detect when the transmission medium has changed either at or after a punctuated noise occurrence. Transmission activities are suspended during the punctuated occurrence. Different transmission parameters and appropriate transmission methods are applied in response to each newly occurring steady state noise level that are appropriate to provide the best possible throughput for a given bit error rate, given the current conditions. An illustrative example is the new transmission parameter set is by using the stored data in each network modem identifying a known steady state noise condition, or by adapting to new parameters if the steady state noise condition is new (i.e., an unknown one). The changes are continuously monitored and always detected. A change in parameters is secondary to detection of when to change parameters and if needed, a change is interrupted to re-change parameters when it is prompted by detection of a change. All network parameters developed are retained in a database. Such a database with parameters for the transmission media may be kept in all modems and according to the principles of the invention are updated frequently.

The flow charted process begins in originating start step 203 and proceeds to instruction block 205 which includes instructions to check the transmission media for its active transmission parameters and its noise status (i.e., either a stable state noise state or the system experiencing a punctuated noise). Instructions in decision block 207 have the system inquire if the transmission noise detected in the previous step 205 is an acceptable steady state noise permitting satisfactory quality transmission. If it is a yes process flow proceeds to the instruction block 209 which specifies that transmission normally proceed and flow returns to the instruction block 205.

If the response of decision block 207 is a no (i.e., the condition is not acceptable) the flow process proceeds to decision block 211 which inquires if the noise situation of the transmission media is a punctuated noise condition (i.e., a transient sharp spike amplitude). If the noise is punctuated (i.e., a yes response) the transmission through the transmission media is halted, as per the instructions of instruction block 213 and process flow returns to the input of instruction block 205.

If the transmission media is not experiencing a punctuated noise condition (i.e., a no output of decision block 211) the system process flow proceeds to the decision block 215 which inquires if the steady state noise condition is defined in the existing data base of previously experienced steady state noise conditions (i.e. the steady state noise condition is defined in the existing data base).

Responding to a positive response output of decision block 215, the instruction block 217 downloads appropriate existing control parameters in to the transmission media control system to control transmission appropriate to achieving quality transmission conditions appropriate to the present steady state noise conditions.

A negative response of decision block 215 (i.e., a no output) directs the process flow to instruction block 219 which processes the detected noise and changes control data in the data base to accommodate the new noise steady state. New control parameters are determined to control the transmission media to provide a desired quality of transmission.

Flow from both instruction blocks 217 and 219 proceeds to instruction block 221 enabling continuance of voice and data transmission in the transmission media. Process flow is returned to the input of instruction block 201 to continue the control of transmission in response to noise conditions.

Figure 3:
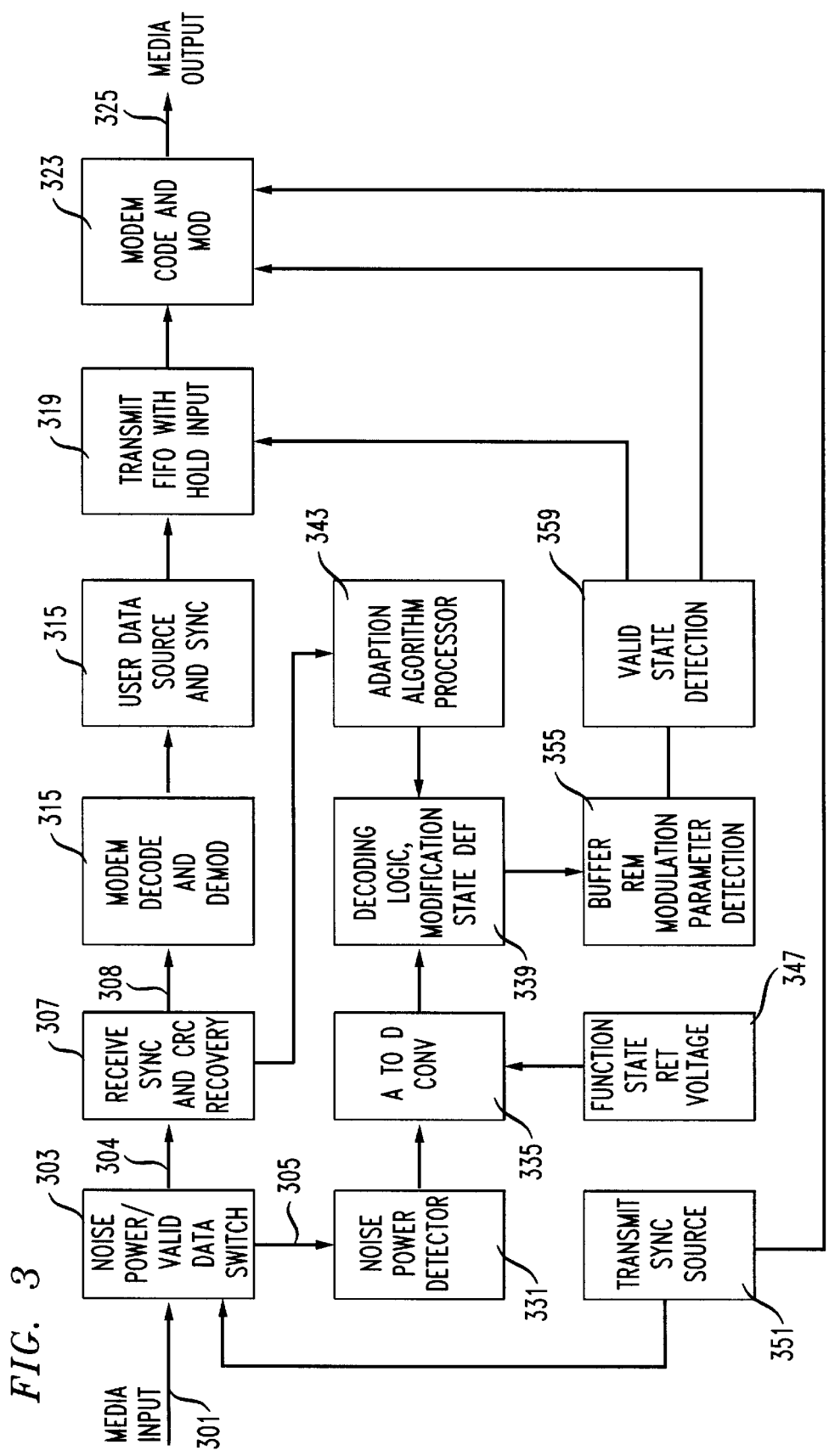
FIG. 3 is a block schematic of an illustrative exemplary transmission system in which the principles of the invention are embodied.

An exemplary transmission system in which the invention is embodied is shown in schematic form in FIG. 3. This system includes transmission media and control circuit operating in response to noise conditions in the transmission media to assure efficiency of operation. Media, in the form of data (i.e., packet) is input at input lead 301 and immediately applied to a noise/data switch 303 which directs noise in the applied signal to a noise power detector 331 via lead 305. The input signal is applied via lead 304 to a recovery circuit, which recovers sync bits and CRC information from the data signal. The signal is applied via lead 308 to a modem 311 which decodes and demodulates the data signal and applies it to a user data source and sink 315 for recognition and use by the media user (i.e., subscriber). Signals for transmission are applied to a transmit FIFO and hold circuit 319 which may hold signals in response to control circuitry (described below). A modem 323 codes and modulates signal output of the FIFO and hold circuit and applies it to the media output lead 325.

Noise detected in the noise power detector 331 is converted to digital form by an Analog-to-Digital converter 335 and compared to a punctuated noise reference state supplied by punctuated state source 347. The output of converter 335 is decoded in a decoding logic and modulation circuit 339 which in response to a algorithm processor 343 defines the state of the noise as punctuated or steady state. The state definition is coupled to a buffer and storage circuit which defines the state and in the instance of a steady state noise supplies operating characteristics for the transmission media. A subsequent valid state detector 359 determines a control signal to either terminate transmission for duration of punctuated noise or apply appropriate parameters for the detected steady state noise level. The control signals are applied to the transmit and hold 319 to halt transmission during punctuated noise and to modem 323 to provide parameters suitable for a steady state noise condition.

A transmit sync source is connected to modems 303 and 323 and supplies synchronization signals to maintain the two modems in synchronization.

A transmission system as described above must continuously and accurately respond to changes in noise conditions of the transmission media by changing the applicable transmission parameters. When a change in transmission parameters takes place, the system will need to transmit special directions to all modems on the network. This will not momentarily disable the system to transmit throughput. The effect will be mainly on real time voice conversation that takes place while the changes occur. Data is packetized and is not normally subject to this restriction. However this will merely translate to a given temporary delay that will be imposed because of the overhead reconfiguration transmission.

The system preferably should be designed to operate in such a way (e.g. at a lower bit rate) so that the synchronization between network elements (i.e., modems) is not lost. This may be accomplished by spreading the synchronization bits between transmission frames, and within/inside the frame. Another technique is to use error correction with interleaving on the synchronization bit sequences through the transmission media in response to a as well as on the data sequences.

What we claim is:

1. A method for improving transmission quality of a low quality transmission media subject to a periodically occurring punctuated noise, comprising the steps of:

monitoring the transmission media and defining a finite plurality of stable states of transmission noise and storing parameters of each of the said plurality of stable states of said transmission noise in a data base;

operating the transmission media using network parameters suitable to an active one of said finite plurality of stable states;

detecting punctuated noise occurrences in the transmission media and terminating transmission through the transmission media for a duration of the punctuated noise occurrence.

2. The method of claim 1, including a further step of:

resuming transmission through the transmission media following the punctuated noise occurrence at one of the finite stable states occurring following the duration of the punctuated noise occurrence.

3. The method of claim 2 including a further step of:

providing new transmission parameters for the transmission media upon occurrence of transmission through the transmission media following completion of the duration of punctuated noise.

4. The method of claim 3, including a further step of:

determining extended non-use of one of the finite plurality of stable states of transmission noise and removing the finite plurality of stable states of transmission noise having extended non-use from the data base.

5. A communication system having a transmission media subject to a periodically occurring punctuated noise, comprising:

means connected to the transmission media for detecting and categorizing noise conditions as one of steady state and punctuated noise;

means responsive to the means for detecting and categorizing for terminating transmission through the transmission media in response to a punctuated noise condition;

means responsive to the means for detecting and categorizing for enabling resumption of transmission through the transmission media in response to a return to a steady state noise condition; and means for adjusting parameters of transmission through the transmission media to provide transmission at a desired transmission quality for a present steady state noise state.

6. A communication system, comprising:

a network including voice and data transmission media;

a monitor circuit, connected to the transmission media, for detecting steady state and punctuated media conditions affecting signal transmissions;

a data storage for storing characteristics of steady state media conditions;

a control circuit connected for defining parameters of the transmission media to be used in response to the monitor circuit and the data storage; and signal modems connected for controlling characteristics of signals applied to the transmission media and being connected to be responsive to the control circuit.

7. A communication system as claimed in claim 6, wherein the monitor circuit further comprises:

a noise power detector connected to media input to the transmission media;

an analog to digital converter connected to digitize output of the noise power detector; and a punctuated noise detector connected to the analog to digital converter, having a digital voltage threshold to identify punctuated departures from steady state noise.

8. A communication system as claimed in claim 7, wherein the data storage includes a buffer storing parameters of a finite number of past steady states of noise; and the control circuit includes a valid state detector connected to control an output modem of the transmission media.

9. A method of controlling transmission parameters of a transmission media to accommodate noise conditions appearing in the transmission media, comprising the steps of:

identifying noised detected as being one of a finite list of steady state noise conditions and a punctuated noise condition;

responding to steady state noise conditions by operating the transmission media with parameters preset to operate at that particular one of the finite list of steady state noise conditions; and terminating operation of the transmission media during existence of the punctuated noise condition.

10. A method of controlling transmission parameters of a transmission media to accommodate noise conditions appearing in the transmission media, as claimed in claim 9, further including a step of:

adding new steady state noise conditions encountered in the transmission media to the finite list of steady state noise conditions; and deleting steady state noise conditions from the finite list of steady state noise conditions if not identified for an extended period of time.

11. In a communication environment in which communication transmission media is subject to punctuated noise occurrences which introduce altered noise levels into the transmission media, a method of responding to altered noise levels to improve transmission quality over the transmission media, the method comprising the steps of:

checking a noise and transmission parameter status of the transmission media;

determining if the transmission parameter status for noise and parameter status is stored in a memory;

using the stored status values to determine the transmission parameters used.

12. The method of claim 11 further including a step of:

removing stored parameter status steady values unused for a specified time duration to keep the values stored to a finite limit.

13. The method of claim 12 further including a step of:

responding to punctuated noise, without stored parameters, by terminating transmission in the transmission media.

14. The method of claim 12 further including a step of:

controlling transmission parameters through application of synchronized input and output modems.

* * * * *